United States Patent
Venkatesan et al.

(10) Patent No.: US 10,567,334 B1
(45) Date of Patent: Feb. 18, 2020

(54) DOMAIN MAPPING FOR PRIVACY PRESERVATION

(71) Applicant: Amazon Technologies, Inc., Seattle, WA (US)

(72) Inventors: Ragav Venkatesan, Seattle, WA (US); Gurumurthy Swaminathan, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 16/021,579

(22) Filed: Jun. 28, 2018

(51) Int. Cl.
| | | |
|---|---|---|
| *H04L 29/06* | (2006.01) | |
| *H04L 29/12* | (2006.01) | |
| *G06F 9/455* | (2018.01) | |
| *G06N 5/04* | (2006.01) | |
| *G06N 20/00* | (2019.01) | |
| *H04L 12/26* | (2006.01) | |

(52) U.S. Cl.
CPC ...... *H04L 61/1511* (2013.01); *G06F 9/45558* (2013.01); *G06N 5/04* (2013.01); *G06N 20/00* (2019.01); *H04L 61/2514* (2013.01)

(58) Field of Classification Search
USPC .......................................................... 709/245
See application file for complete search history.

(56) References Cited

U.S. PATENT DOCUMENTS

| | | | | |
|---|---|---|---|---|
| 10,431,219 | B2* | 10/2019 | Danila | G06F 17/2765 |
| 2005/0125311 | A1* | 6/2005 | Chidiac | G06Q 10/087 |
| | | | | 705/28 |
| 2015/0373039 | A1* | 12/2015 | Wang | H04L 63/1425 |
| | | | | 726/23 |
| 2015/0373043 | A1* | 12/2015 | Wang | G06F 21/552 |
| | | | | 706/12 |
| 2017/0004527 | A1* | 1/2017 | Wu | G06Q 30/0255 |
| 2019/0068914 | A1* | 2/2019 | Casner | H04N 5/915 |
| 2019/0103101 | A1* | 4/2019 | Danila | G10L 15/22 |

* cited by examiner

*Primary Examiner* — Jude Jean Gilles
(74) *Attorney, Agent, or Firm* — Nicholson De Vos Webster & Elliott, LLP

(57) ABSTRACT

Implementations detailed herein include description of a computer-implemented method. In an implementation, the computer-implemented method including training a machine learning model using domain mapped third party data; and performing inference using the machine learning model by: receiving scoring data, domain mapping the received scoring data using a domain mapper that was used to generate the domain mapped third party data, and applying the machine learning model to the domain mapped received scoring data to generate an output result.

20 Claims, 15 Drawing Sheets

LISTINGS
217

ALGORITHM 301
    CATEGORY:SUBCATEGORY
    API DEFINITION
    SUGGESTED RESOURCE REQUIREMENTS
    SUGGESTED TRAINING DATA
    RELATIVE USAGE IN CATEGORY:SUBCATEGORY
    STORAGE LOCATION

MODEL 303
    CATEGORY:SUBCATEGORY
    API DEFINITION
    SUGGESTED RESOURCE REQUIREMENTS
    RELATIVE USAGE IN CATEGORY:SUBCATEGORY
    ACCURACY
    STORAGE LOCATION
    LATENCY

DATA 305
    CATEGORY:SUBCATEGORY
    RESOURCE REQUIREMENTS
    RELATIVE USAGE IN CATEGORY:SUBCATEGORY
    STORAGE LOCATION

NOTEBOOK 307
    CATEGORY:SUBCATEGORY

PIPELINE 309
    CATEGORY:SUBCATEGORY
    SUGGESTED RESOURCE REQUIREMENTS
    RELATIVE USAGE IN CATEGORY:SUBCATEGORY
    ACCURACY
    STORAGE LOCATION
    LATENCY

*FIG. 3*

DOMAIN MAPPING FOR PRIVACY PRESERVATION

BACKGROUND

Machine learning and data analysis algorithms can be applied to many domains, ranging from medical image analysis to insurance, financial data (e.g. fraud detection), and social networks (e.g. image and text understanding, graph analysis). With advances in artificial intelligence and related applications more and more users are starting to engage with these systems.

BRIEF DESCRIPTION OF DRAWINGS

Various embodiments in accordance with the present disclosure will be described with reference to the drawings, in which:

FIG. 3 illustrates embodiments of formats of listings.

DETAILED DESCRIPTION

Various embodiments of methods, apparatus, systems, and non-transitory computer-readable storage media for using a mapping of data in a first domain into a second domain and using the data of the second domain to train a machine learning model are described.

Unfortunately, while the desire to use machine learning models/algorithms is high, not all programmers and/or system administrators have the time or requisite knowledge to produce this content or integrate it into a pipeline of actions.

In embodiments detailed herein, producers who produce data, algorithms, and/or models make them available to other parties via a registry-based system. Requesters search this register to find algorithms, models, and/or data for their own purposes. In some embodiments, one or more schemas are utilized to build machine learning pipelines using one or more of the algorithms, models, and/or data made available via the registry-based system. The schemas enable a requester to build machine pipelines without the need to perform one or more of generating an algorithm, training an algorithm, generating or curating data for training, etc.

Some providers of data made available via the registry-based system may want to restrict the usage or general applicability of their data. For example, if the data is made freely available, the user of the data may copy the data for use elsewhere or sell resell that data. Additionally, the data may have sensitive or private data such as faces, etc. that the data provider may not want to be freely viewed. Embodiments detailed herein allow for provided data to be domain mapped (such as scrambled) and then used for training without going back to the original domain. The domain mapped data has properties of the original data such that the training using the domain mapped data is still satisfactory.

For the trained model to work correctly for inference, a domain mapper is provided with the domain mapped data. This domain mapper is used to domain map scoring data before using the trained model. In some embodiments, to help avoid identifying the domain mapping technique, the data provider has multiple domain mappers to choose from so that the data user cannot decode the domain mapping technique.

Figure 1:
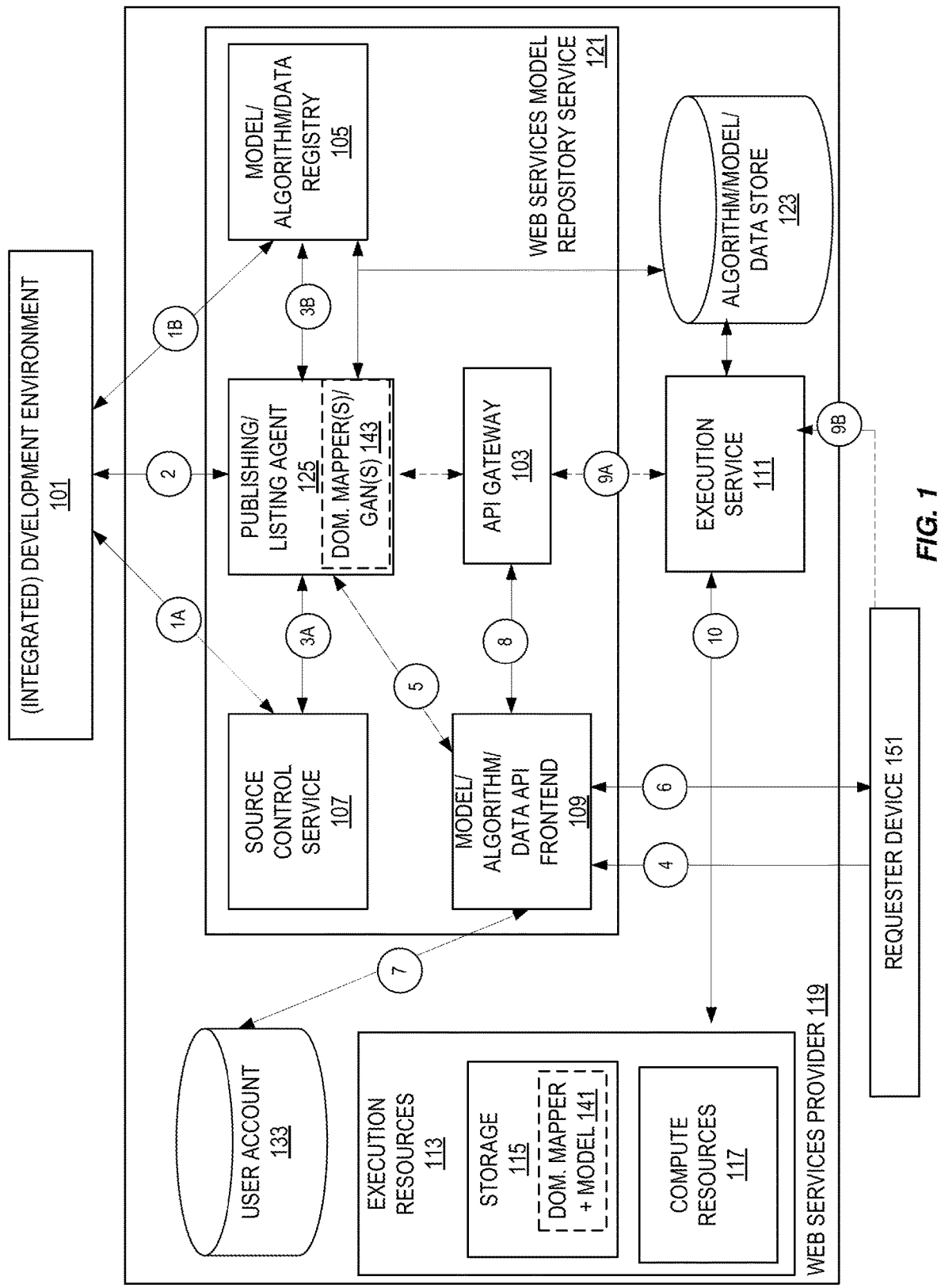
FIG. 1 illustrates examples of embodiments supporting suggesting and/or combining algorithm/model/data.

FIG. 1 illustrates examples of embodiments supporting suggesting and/or combining algorithm/model/data. As shown, a web services provider 119 includes many different services to support the availability of third party content to a requester. Each of the components of the web services provider (other than storage) is software stored in memory and executing on hardware.

An (integrated) development environment 101 allows a producer to generate or otherwise provide content (algorithms, data, models, pipelines, notebooks, etc.) to be made available by a web services model repository service 121 of the web services provider 119. While shown outside of the web services provider 119, in some embodiments the (integrated) development environment 101 is service of the (integrated) development environment 101. In some embodiments, interpreted programming language support is provided to the (integrated) development environment 101.

In some embodiments, a producer is provided with multiple programming interfaces for interpreted languages, such as Ruby/Perl/R/Python, via the (integrated) development environment 101 to develop code which is then input into a source control service 107. The source control service 117 stores code, binaries, and/or metadata in a redundant fashion. The source control service 117 allows for collaboration with local and remote teams to edit, compare, sync, and/or revise stored code and track those actions. In some embodiments, the source control service 117 hosts code repositories of a third party. The source control service 117 encrypts the code, binaries, and/or metadata it stores and, in some embodiments, is coupled to, or includes, a permission system to dictate access to the code, binaries, and/or metadata stored. In some embodiments, a producer provides a few unit test cases (inputs and outputs) to be used in verification and testing. In some embodiments, a producer provides a container to the web services model repository service 121 using a model/algorithm container registry 105. This container is shared as an image. In some embodiments, a model/algorithm container registry 105 is a fully-managed container registry that allows for storing, managing, and deploying of container images.

The web services model repository service 121 allows for a producer to share generated content with others. The content that is shared is searchable as listings. In particular, a requester interfaces with a model/algorithm/data application programming interface (API) frontend 109 to find and select shared content through requests serviced by a publishing/listing agent 125. In some embodiments, the API frontend 109 tracks which requests did not get a satisfactory result (no selection is made or no result generated). In some embodiments, unsatisfactory results are used to prompt producers for content.

The publishing/listing agent 125 publishes received code, containers, and data, and responds to queries. Each of these actions are detailed more below. Published algorithms, models, and data are stored in algorithm/model/data store 123 (of course, this storage may be spread across many physical devices). The store 123 may also store pipelines and/or notebooks.

Further, in some embodiments, the publishing/listing agent 125 is used by a requester to build a pipeline and/or cause execution or training of a selected model or algorithm using execution resources 113 (hardware compute resources 117 and storage 115) via an execution service 111. In some embodiments, the execution resources 113 use virtualization as detailed below. In some embodiments, container images include one or more layers, where each layer represents executable instructions. Some or all of the executable instructions together represent an algorithm that defines a machine learning model. The executable instructions (e.g., the algorithm) can be written in any programming language (e.g., Python, Ruby, C++, Java, etc.). In some embodiments, virtual machine instances are utilized to host containers. In some embodiments, each virtual machine instance includes an operating system (OS), a language runtime, and one or more machine learning (ML) training containers 130.

In some embodiments, the publishing/listing agent 125 utilizes domain mappers (such as scramblers) 143 to domain map provided data. In some embodiments, a generative adversarial network (GAN) produces one or more domain mappers per registered data. As noted above, domain mappers generate domain mapped data through a one-way function. Thus, domain mappers transform the original data in an original source domain into "domain-mapped data" in a target domain, where both the original domain and the target domain have common properties (e.g., discriminative properties) that can be learned by a same network—e.g., the original domain is image data, and the target domain is also image data. However, generated properties of the domain-mapped data—e.g., what the data "looks" like to a typical user—is sufficiently different from that of the original data. Accordingly, if the machine is a classifier, the classification properties from the original data are maintained while other properties are not maintained, and thus come from the target domain.

For example, if the original data (source domain) has properties A, B, C, and D, and property B is of interest, property B is retained while A, C, and D have properties of the target domain. The retained properties relate to the end use case (such as image classification). As such, the domain mapped data will look like data of the target domain. Note the source and target domain have properties that can be learned by the same network.

In other embodiments, the data provider utilizes its own domain mapper and provides already domain mapped data (and the domain mapper) to the be listed in the model/algorithm/data register 105 and/or stored in the algorithm/model/data store 123. In some embodiments, the GAN 143 includes a domain match judge to maximize for the domain mapped domain data and minimize for asset (non-domain mapped) data, and a decoder to maximize for asset data and minimize for domain mapped data.

A user account 133 per producer and requester stores information about what content been shared and what content being used. Further, in some embodiments, a pipeline is stored in a user account 133. The user account 133 is accessed through the frontend 109.

In some embodiments, the web services model repository service 121 is as one or more virtual machines running one or more hosts. In some embodiments, the web services model repository service 121 is load balanced to handle more or less traffic using more optimal hardware configurations.

For training, in some embodiments, scrambled data is used to train the algorithm/model. For example, an algorithm is trained using domain mapped data selected from model/algorithm/data registry 105 and stored in model/algorithm/data store 123, or a selected algorithm of the model/algorithm/data register 105 is trained using domain mapped data that was also selected from the model/algorithm/data registry 105 and stored in model/algorithm/data store 123.

For execution (inference) of a model trained on domain mapped data, a domain mapper is first applied to the scoring data and then the model that was trained using domain mapped data is used. The domain mapped data is locatable from the registry 105 and stored in the algorithm/model/data store 123 along with a domain mapper.

FIG. 1 also includes circles with numbers inside. These indicate potential actions that may occur. At circles 1A and 1B, a producer shares code and containers respectively to be published. At circle 2, a request is made to publish and list the code, container, or data. At circles 3A and 3B, the publishing/listing agent 125 performs actions for publishing and listing of models, algorithms, and/or data.

At circle 4 a requester 151 makes a request (query) for content. This request is received by the model/algorithm/data application programming interface (API) frontend 109 and forwarded to the publishing/listing agent 125. The publishing/listing agent 125 checks its listings and provides a result at circle 5. In some embodiments, the user account 113 for the requester is accessed to see what the requester is allowed to access in terms of hardware, etc.

The requester selects content from the result and provides this selection and/or code using this selection at circle 6. In some embodiments, interaction also includes a request to execute or train. In some embodiments, the publishing/listing agent 125 selects what it feels is best and merely alerts the requester as to the selection. In some embodiments, the user account 113 for the requester is accessed at circle 7 to pull a pipeline that the selected content is to be a part of and the selection and pipeline are forwarded to the publishing/listing agent 125.

In some embodiments, an API gateway 103 takes in a request at circle 8 to start execution (e.g., inference) or training by an execution service 111. The API gateway 103 instructs the execution service 111 at circle 9A. In some embodiments, the publishing/listing agent 125 acts as an intermediary between the frontend 109 and the API gateway 103 and fills in a provided pipeline with the selection prior to the instruction to the execution service 111 to execute the pipeline or training of components thereof. The execution service 111 access the selected algorithm, model, and/or data in data store 123 to use a copy of the selection (an instance) to be used in the execution or training (including use of a scrambled data for training, and the use of a scrambler on a scrambler trained model 141 as needed), and starts execution at circle 10. In some embodiments, the requester makes a direct request to the execution service 111 to start execution (e.g., inference) or training at circle 10. Further, in some embodiments, the execution service 111 provides execution metrics back to the publishing/listing agent 125.

Figure 2:
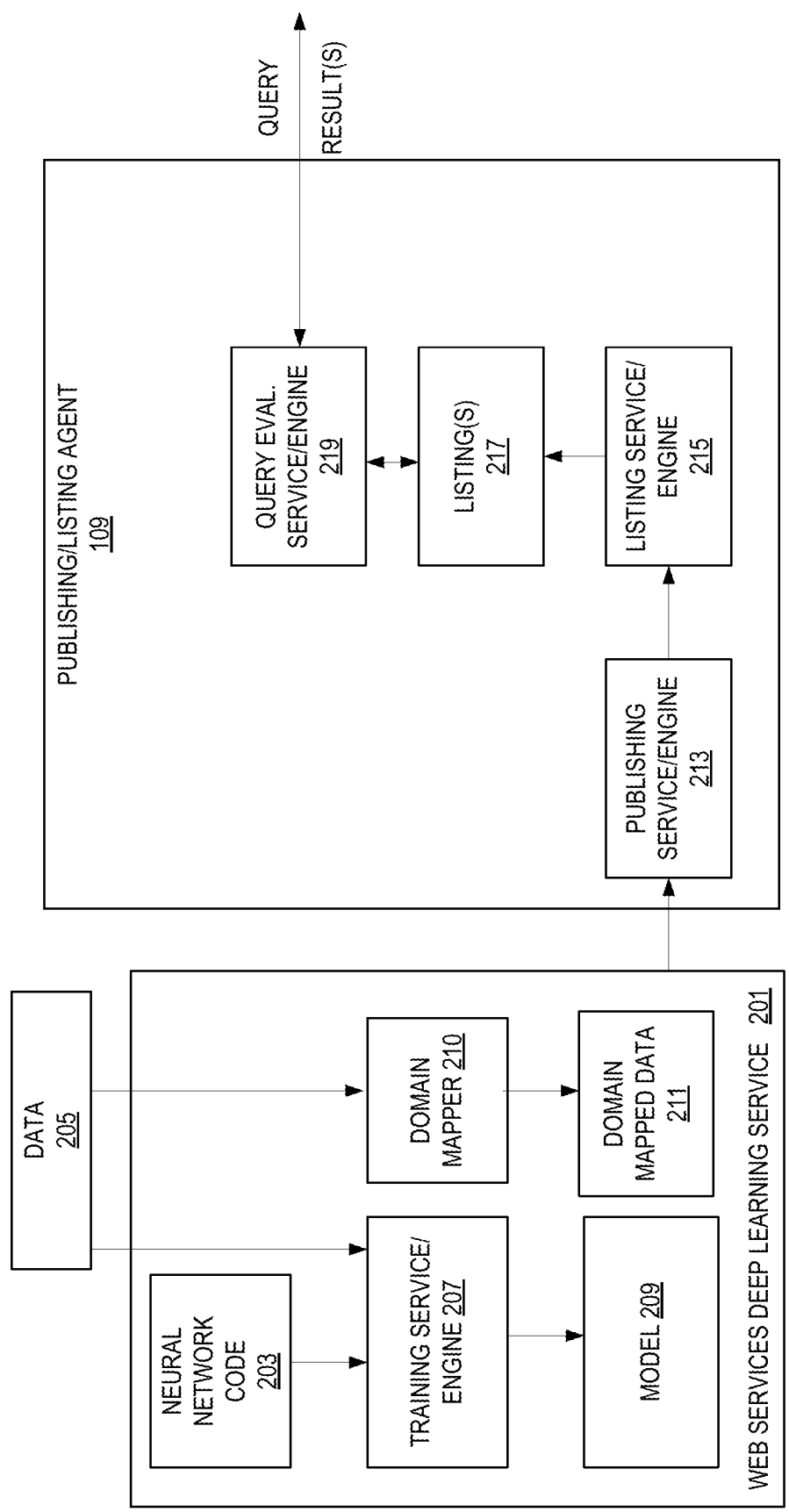
FIG. 2 illustrates embodiments of components of a publishing/listing agent and how they interact with a trained model.

FIG. 2 illustrates embodiments of components of a publishing/listing agent and how they interact with a trained model. In this illustration, a web services deep learning service 201 (for example, web services machine learning model developer service 401) utilizes neural network code (algorithm) 203 and training data 205 to perform training using a training engine 207 to produce a model 209. For example, a producer uses this service to train a model 209 to be made available through the publishing/listing agent 125. Note the components of the publishing/listing agent 125 similarly work with submitted algorithms, data, pipelines, etc.

The model 209 is provided to the publishing/listing agent 125. In some embodiments, the model 209 is supplied to a publishing service (or engine) 213 which publishes the model.

Data 205 may also be subjected to a domain mapper 210 to produce domain mapped data 211. The unmapped data is published and the domain mapped data 211 either stored or generated on-demand using the domain mapper 210.

The next service/engine to be used is listing service (or engine) 215 which generates searchable listing of a plurality of listings 217. Embodiments of actions of the listing service (or engine) 215 are described with respect to FIG. 7.

A request query comes into the publishing/listing agent 125 into a query evaluation service (or engine) 219. A query may include one or more of: a category (and subcategory), data information (format of what is available to the requester), resource availability (what resources are available for use such as a processor type), timing information (such as desired latency), an indication of a pipeline that the model/algorithm/data is to be used for), accuracy desired, type of content desired (algorithm, model, and/or data), etc.

The query evaluation service (or engine) 219 evaluates for a received query to determine which listing(s) to suggest. For example, the query evaluation service (or engine) 219 looks at listing(s) 217 and compares them to determine which one(s) match the query.

In some embodiments, the output includes information about the input/output in the form of a schema. For example, an exemplary schema for image analysis is as follows:
    input: tuple {input-data, location}
        input-data can be {text-snippet, image, video}
            location (optional) is one of {bounding box, text-window, video-frame-indices}
        output: list of predictions where each prediction contains
            a tuple {input-data, value, location, confidence}
            value can be one of {text, class, value, vector}
            location (optional) is one of {bounding box, text-window, video-frame-indices}
            confidence is a real number FIG. 3 illustrates embodiments of formats of listings. An algorithm listing format 301 includes one or more of: a category:subcategory (subcategories) of the algorithm, an API definition (input/output format), suggested resource requirements to train the algorithm, relative usage of the algorithm in the category:subcategory (subcategories), and a storage location of the algorithm (so that it can be hosted/used by the requester).

A model listing format 303 includes one or more of: a name, a category:subcategory (subcategories) of the model, an API definition (input/output format), suggested resource requirements to use the model, relative usage of the model in the category:subcategory (subcategories), accuracy of the model, latency of the model, and a storage location of the model (so that it can be hosted/used by the requester).

A data listing format 305 includes one or more of: a name, a category:subcategory (subcategories) of the data, resource requirements (size of the data), relative usage of the data in the category:subcategory (subcategories), and a storage location of the data (so that it can be hosted/used by the requester).

In some embodiments, a notebook listing 307 is provided and includes at least a category:subcategory.

A pipeline listing format 309 includes one or more of: a name, a category:subcategory (subcategories) of the model, suggested resource requirements to use the model, relative usage in the category:subcategory (subcategories), accuracy, latency, and a storage location (so that it can be hosted/used by the requester).

In some embodiments, one or more of the formats 301-309 include one or more of: a schema used, an indication of the producer, reviews, examples, a version, and documentation of usage.

Figure 4:
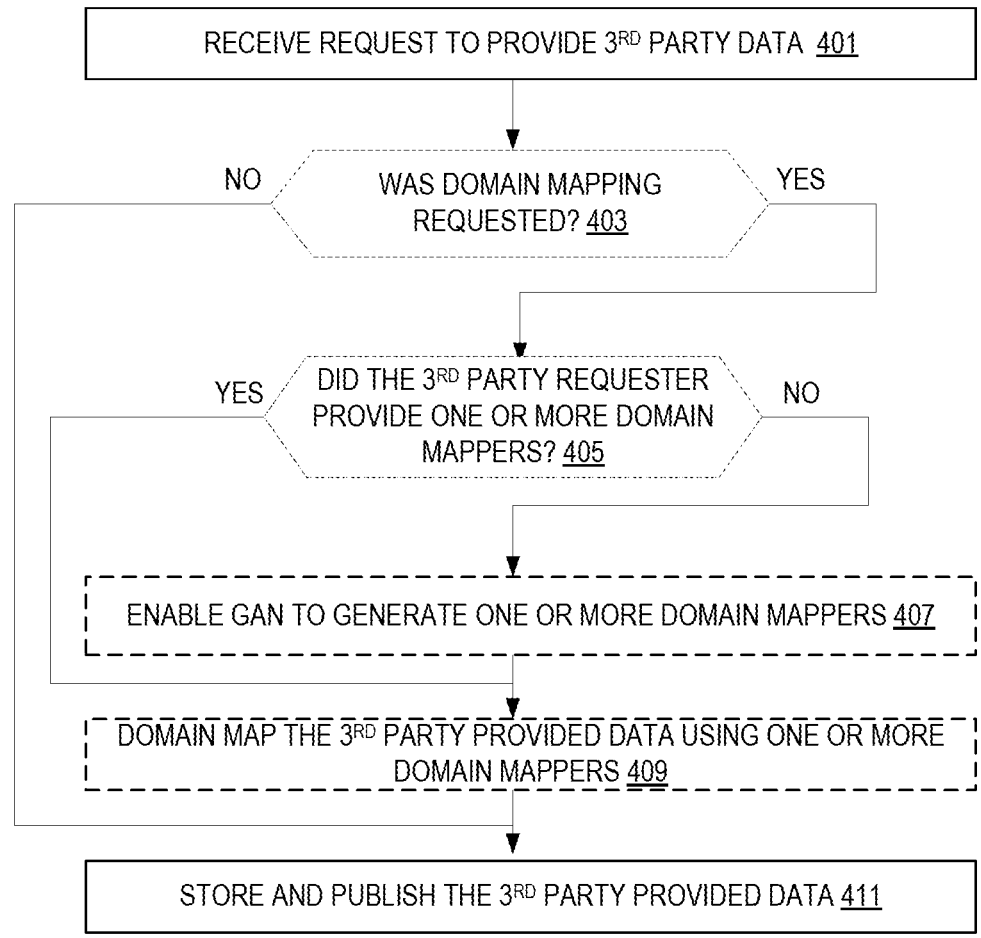
FIG. 4 illustrates embodiments of a method for publishing data.

FIG. 4 illustrates embodiments of a method for publishing data. In particular, the method is performed internally to a web services provider. In some embodiments, this method is performed by the publishing/listing agent 125.

At 401, a request to provide the data as a data contribution is received by the web services provider. Depending upon the implementation the request may take different forms. In some embodiments, the request includes the data itself, while in others the request provides an indication of where the data is stored (such as a link to an internal or external storage location).

In some embodiments, the request includes an indication of if domain mapping (such as scrambling) is requested on the data. At 403, a determination of the request includes such an indication is made. When there is not such indication, the data is stored (or linked) and published at 411.

When the request does indicate that domain changing of the data is to occur, a determination of if the requester provided one or more domain mappers (functions, models, etc.) is made at 405. The one or more domain mappers may be provided as a part of the request itself, or as an indication of where the one or more domain mappers are stored (such as a link to an internal or external storage location).

When the domain mappers are not provided, a GAN (or other domain changing function or model generator) is enabled to generate one or more domain mappers at 407. As noted above, a domain mapper generates domain mapped data through a one-way function that retains properties of interest of the original data and includes generated properties of the target.

In some embodiments, the provided data is subjected to a domain mapping using one or more domain mappers at 409 prior to storage and publishing at 411. In these instances, the provided data, domain mapped data, and domain mappers are stored (for example, in algorithm/model/data store 123). However, in some embodiments, the provided data is stored and published without performing any domain map and any domain map will occur dynamically as needed.

Figure 5:
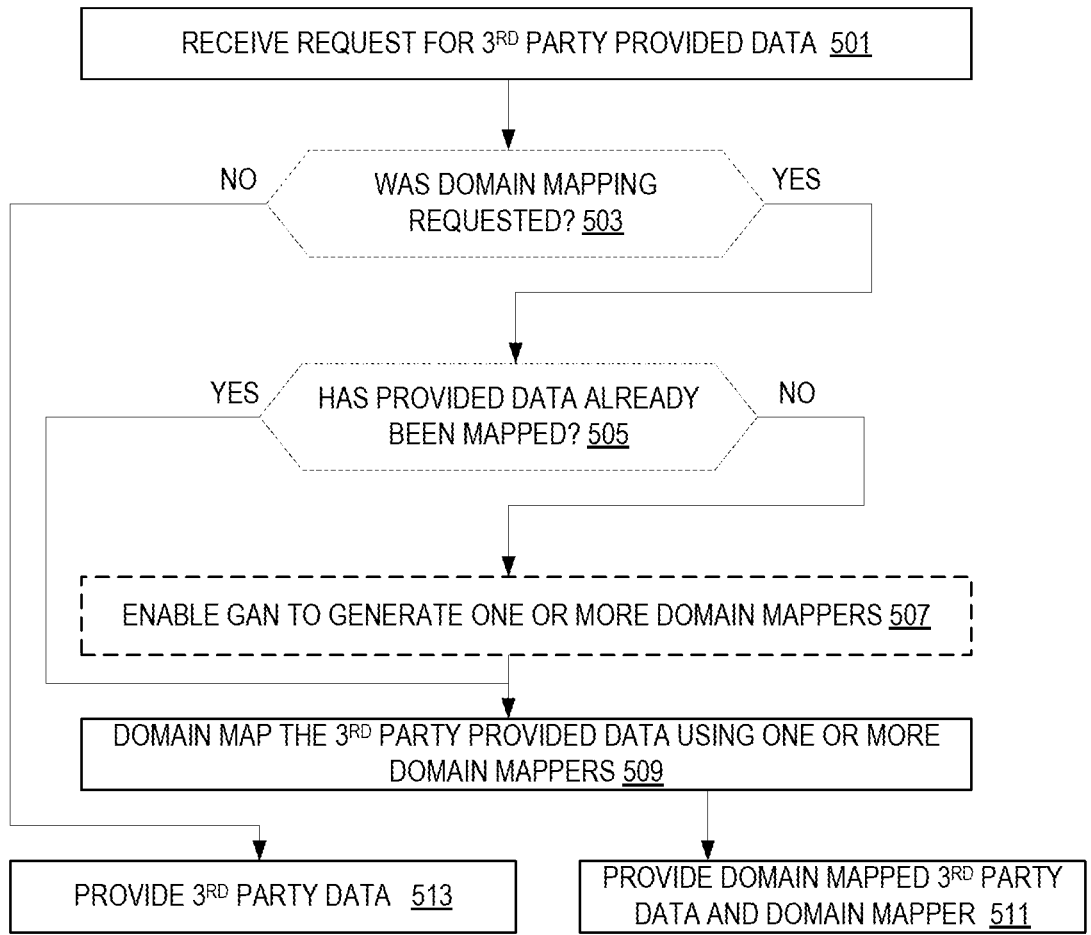
FIG. 5 illustrates embodiments of a method for providing $3^{rd}$ party provided data.

FIG. 5 illustrates embodiments of a method for providing $3^{rd}$ party provided data. In particular, the method is performed internally to a web services provider. In some embodiments, this method is performed by the publishing/listing agent 125, model/algorithm/data API front end 109, and/or API gateway 103.

At 501, a request to use $3^{rd}$ party provided data is received by the web services provider. Typically, the request comes via the model/algorithm/data API front end 109. The request identifies the requester and the $3^{rd}$ party provided data to be used. The publishing/listing agent 125 finds the location of the requested $3^{rd}$ party provided data in the model/algorithm/data registry 105.

In some embodiments, a $3^{rd}$ party provider of the provided data indicates if domain mapping (such as scrambling) is requested on the data. At 503, a determination of the provider made such an indication is made. When there is not such an indication, the $3^{rd}$ party data is provided at 513.

When the $3^{rd}$ party provider did indicate that domain mapping of the data is to occur, a determination of if the $3^{rd}$ party provided data has already been mapped (for example, using one or more domain mappers (functions, models, etc.)) is made at 505.

In some embodiments, when the $3^{rd}$ party provided data has not been mapped and no domain mapper has been provided, a GAN (or other domain changing function or model generator) is enabled to generate one or more domain mappers at 507. As noted above, domain mappers generate domain mapped data through a one-way function that retains properties of interest of the original data and includes generated properties of the target.

The $3^{rd}$ party provided data is domain mapped at 509. For example, the mapping may use a GAN generated domain mapper or a previously provided domain mapper (if available) to generate domain mapped data.

The domain mapped data is provided along with the domain mapper used to do the mapping at 511. A model is trained using the domain mapped data.

Figure 6:
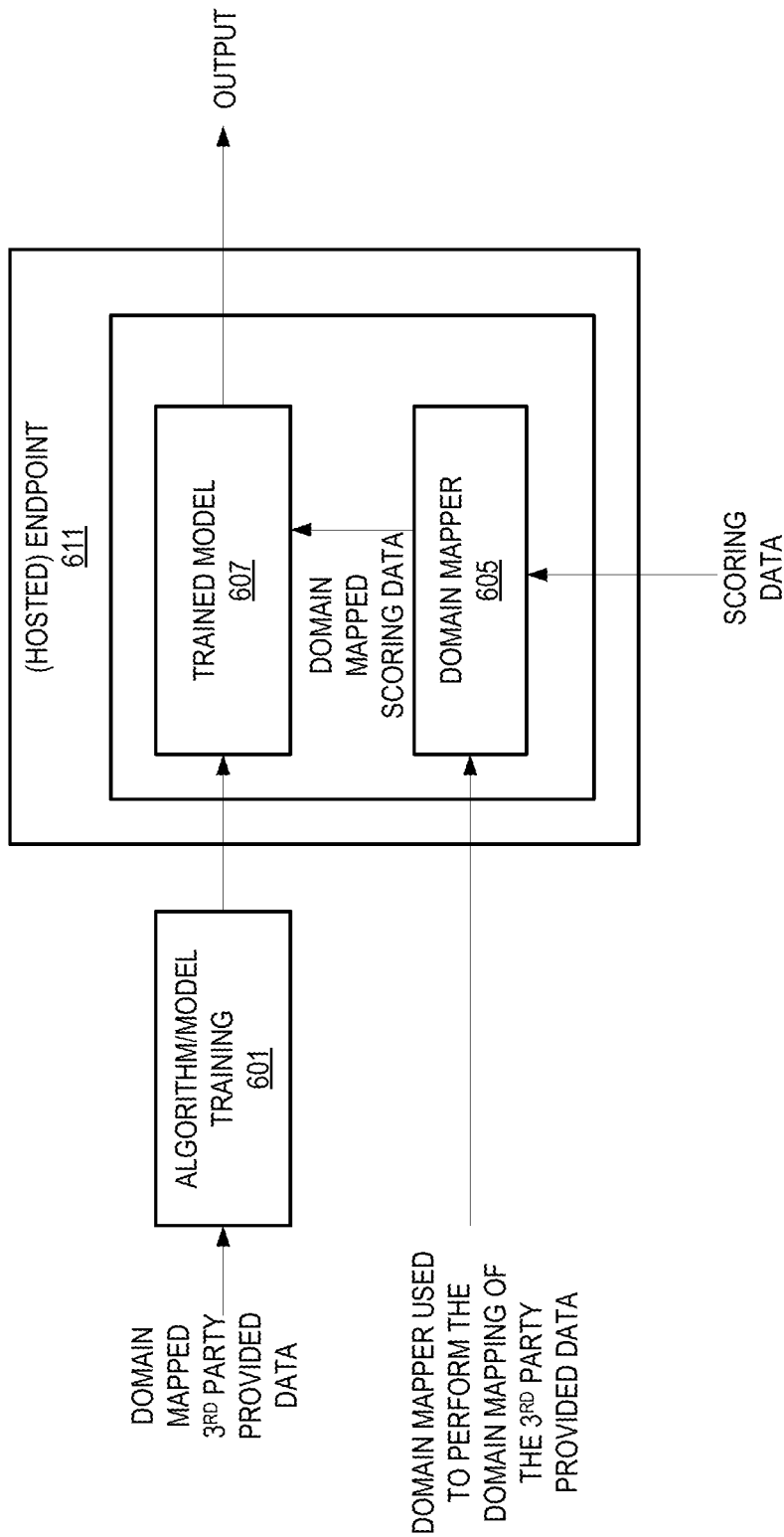
FIG. 6 illustrates embodiments of using $3^{rd}$ party provided data in training and inference.

FIG. 6 illustrates embodiments of using $3^{rd}$ party provided data in training and inference. As shown, domain mapped $3^{rd}$ party provided data is utilized in an algorithm/model training environment 601. This training environment 601 may be a hosted environment (such as shown in FIG. 1) or local. Regardless of the location of the training environment 601, the training of the algorithm or model uses the domain mapped $3^{rd}$ party provided data, not the original $3^{rd}$ party provided data. The output of the training environment 601 is a trained model 607.

This trained model 607 is then usable for inference at an endpoint 611. The endpoint 611 may be hosted (as in FIG. 1) or local. However, for the trained model 607 to produce appropriate results, scoring data (that is data to evaluated using the trained model 607) is first subjected to the domain mapper 605 that was used to perform the domain mapping of the domain mapped $3^{rd}$ party provided data before the model 607 is applied. The output of the domain mapper 605 is domain mapped scoring data. In some embodiments, the domain mapper 605 is not provided to the user using the trained model 607 (the user does not have possession of the domain mapper 605), but is accessible (that is, can be utilized) through a call.

The domain mapped scoring data is provided to the trained model 607 which generates an output.

Figure 7:
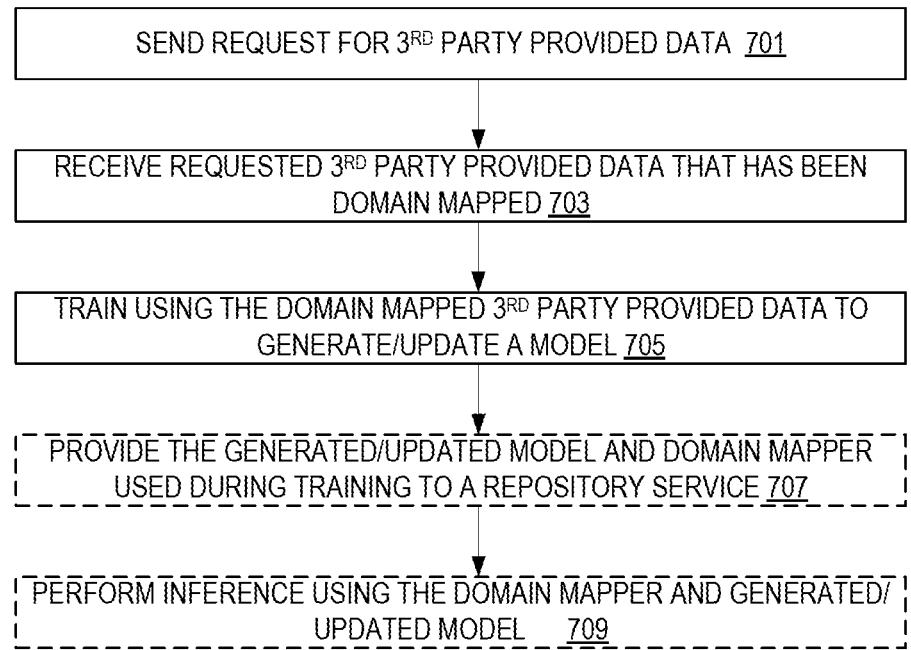
FIG. 7 illustrates embodiments of methods of using $3^{rd}$ party provided data in training and/or inference.

FIG. 7 illustrates embodiments of methods of using $3^{rd}$ party provided data in training and/or inference. Embodiments of the methods are performed in a web services provider system (such as that shown in FIG. 1) and/or using local resources.

At 701, a request for $3^{rd}$ party provided data is sent. For example, the request is sent from a requester device to the model/algorithm/data API frontend 109. The request includes an identification of the $3^{rd}$ party provided data.

At 703, the requested $3^{rd}$ party provided data is received as domain mapped $3^{rd}$ party provided data along with the domain mapper used to generate the domain mapped $3^{rd}$ party provided data. This reception may be outside of the web services provider system hosting the requested $3^{rd}$ party provided data or be in the form of a path to the domain mapped $3^{rd}$ party provided.

Training using the domain mapped $3^{rd}$ party provided data to generate/update a model is performed at 705. In some embodiments, resources of the web services provider are allocated to train an algorithm/model using the received domain mapped third party data. In other embodiments, the algorithm/model is trained using local resources. In some embodiments, the generated/updated model and the domain mapper are containerized. In some embodiments, the algorithm/model to train has been provided by the repository service.

In some embodiments, the generated/updated model and domain mapper used during training is provided to a repository service at 707. For example, the generated/update model (or generated container) is made available to other users.

At 709, inference is performed using the domain mapper and generated/updated model. In some embodiments, resources of the web services provider are allocated to train an algorithm/model using the received domain mapped third party data (for example, using the generated container). In other embodiments, the algorithm/model is trained using local resources. Inference using domain mapper and generated/updated model includes receiving scoring data, domain mapping the received scoring data using the domain mapper, and applying the model to the domain mapped received scoring data to generate an output result. Further, the output result may be provided to another function, an external device, stored, etc.

Figure 8:
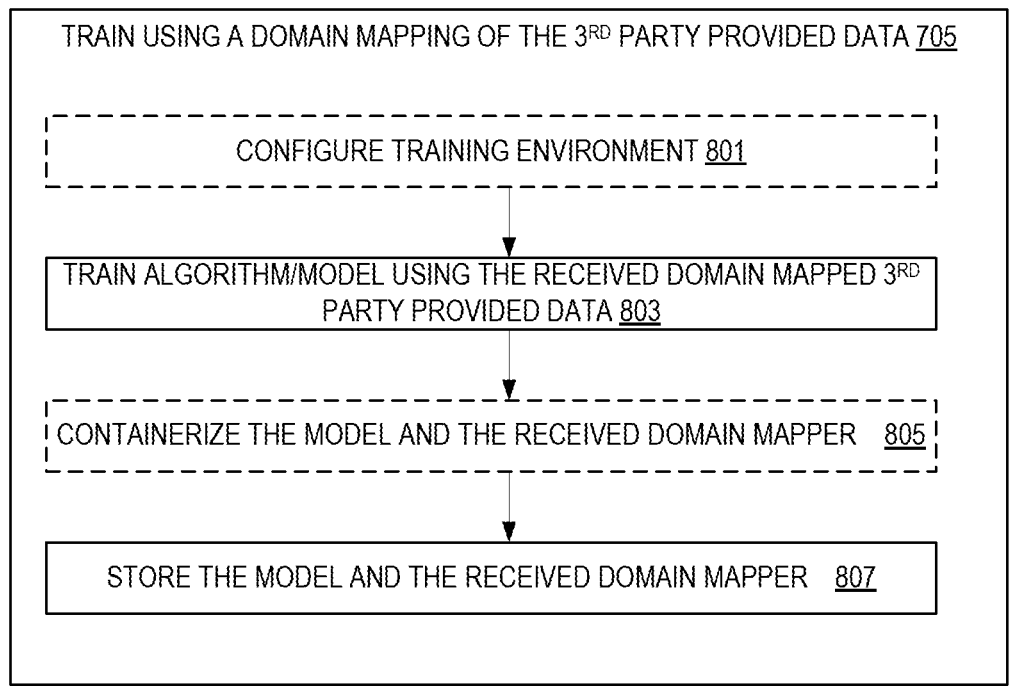
FIG. 8 illustrates embodiments of methods of training using the domain mapped $3^{rd}$ party provided data to generate/update a model.

FIG. 8 illustrates embodiments of methods of training using the domain mapped $3^{rd}$ party provided data to generate/update a model. Embodiments of the methods are performed in a web services provider system (such as that shown in FIG. 1) and/or using local resources.

At 801, in some embodiments, the training environment is configured. For example, a hosted system may be used to train an algorithm or model. The configuration of this environment may include executing a training routine on a virtual machine and/or as a ML container, or in a more localized environment.

At 803, the algorithm or model is trained using the domain mapped $3^{rd}$ party provided data. In some embodiments, the resulting model of this training is containerized along with the received domain mapper at 805.

The trained model and received domain mapper (or container) are stored at 807. For example, the trained model and received domain mapper (or container) are stored in storage 115 and/or a long-term storage such as a database.

Figure 9:
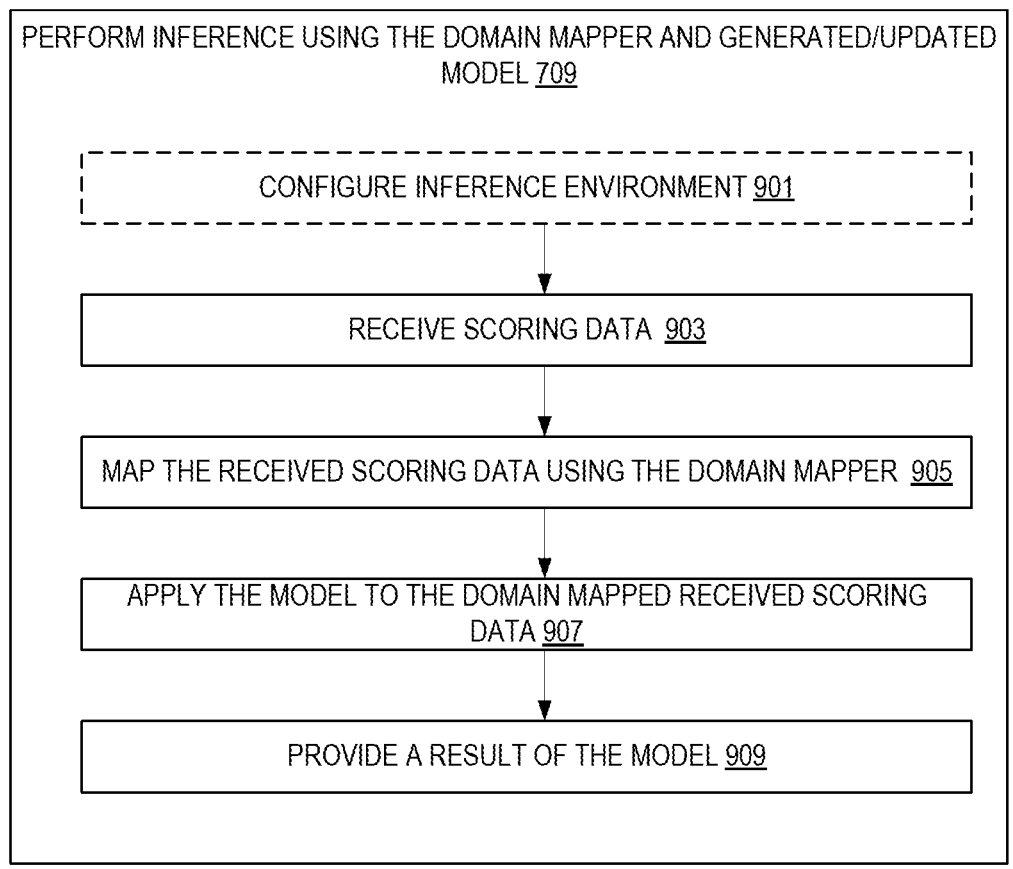
FIG. 9 illustrates embodiments of methods of performing inference using the domain mapper and generated/updated model.

FIG. 9 illustrates embodiments of methods of performing inference using the domain mapper and generated/updated model. Embodiments of the methods are performed in a hosted endpoint of a web services provider system (such as that shown in FIG. 1) and/or using local resources.

At 901, in some embodiments, the inference environment is configured. For example, a hosted system may be used to perform inference using the model and domain mapper. The configuration of this environment may include executing an inference routine on a virtual machine and/or as a ML container, or in a more localized environment.

At 903, scoring data is received.

At 905, the scoring data is mapped using the domain mapper that was used to generate domain mapped $3^{rd}$ party provided data used to train the model.

The model is then applied to the mapped scoring data at 907 and a result provided at 909.

Figure 10:
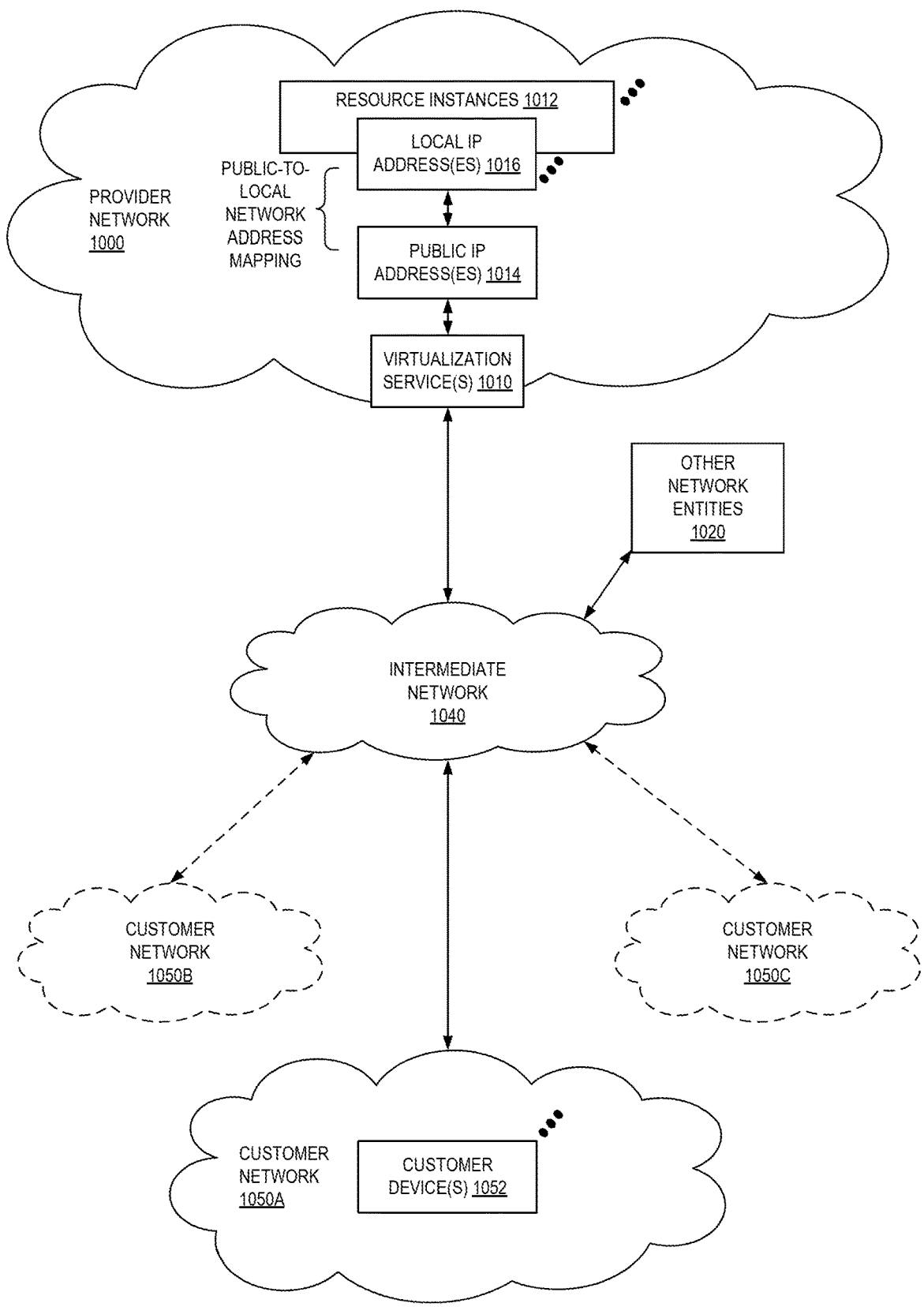
FIG. 10 illustrates an example provider network environment according to some embodiments.

FIG. 10 illustrates an example provider network (or "service provider system") environment according to some embodiments. A provider network 1000 may provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 may be associated with the resource instances 1012; the local IP addresses are the internal network addresses of the resource instances 1012 on the provider network 1000. In some embodiments, the provider network 1000 may also provide public IP addresses 1014 and/or public IP address ranges (e.g., Internet Protocol version 4 (IPv4) or Internet Protocol version 6 (IPv6) addresses) that customers may obtain from the provider 1000.

Conventionally, the provider network 1000, via the virtualization services 1010, may allow a customer of the service provider (e.g., a customer that operates one or more client networks 1050A-1050C including one or more customer device(s) 1052) to dynamically associate at least some public IP addresses 1014 assigned or allocated to the customer with particular resource instances 1012 assigned to the customer. The provider network 1000 may also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of customer network(s) 1050A-1050C may, for example, implement customer-specific applications and present the customer's applications on an intermediate network 1040, such as the Internet. Other network entities 1020 on the intermediate network 1040 may then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 may be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1000; a customer may then assign their allocated public IP addresses to particular resource instances allocated to the customer. These public IP addresses may be referred to as customer public IP addresses, or simply customer IP addresses. Instead of being assigned by the provider network 1000 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
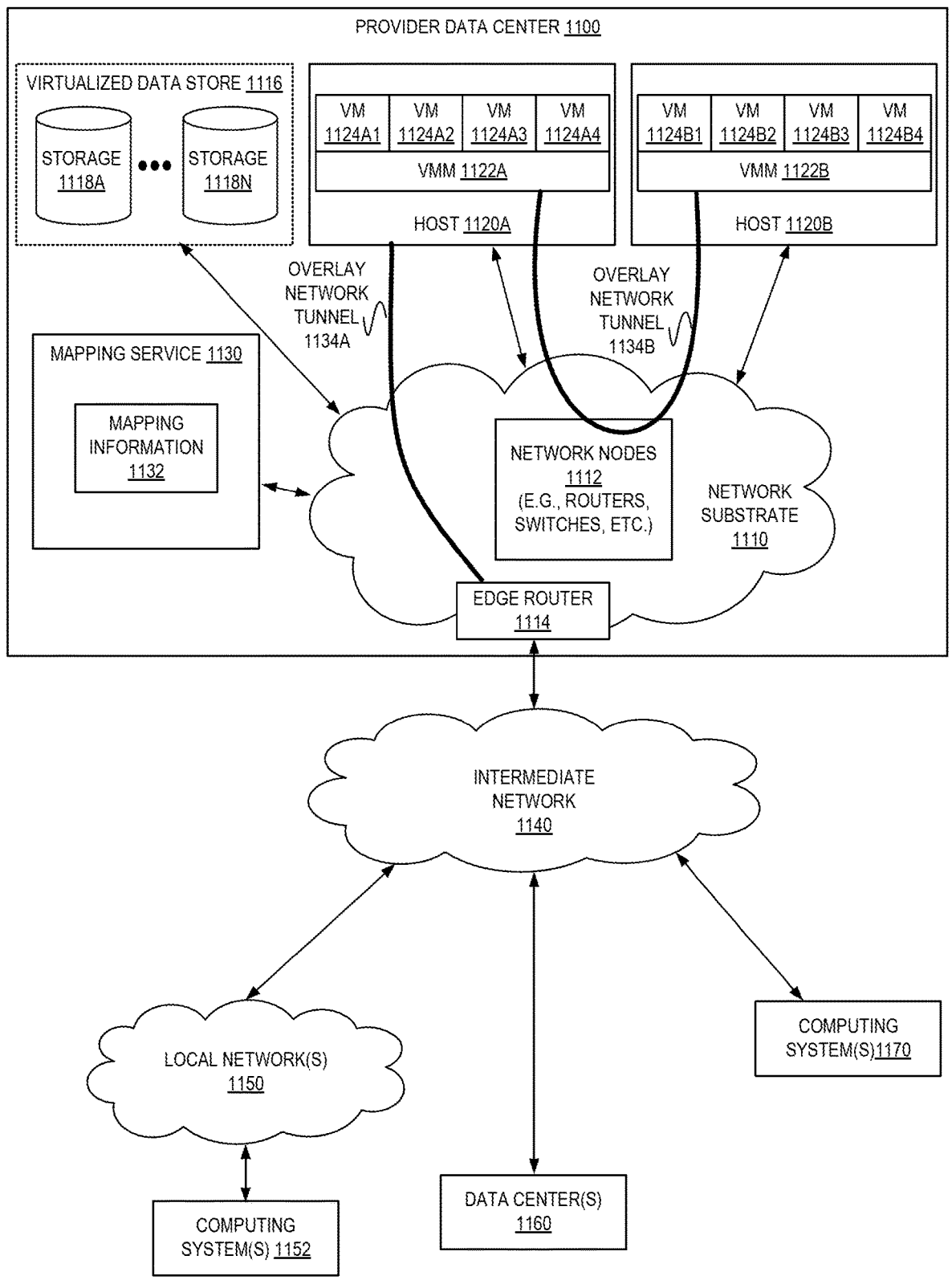
FIG. 11 illustrates an example data center that implements an overlay network on a network substrate using IP tunneling technology according to some embodiments.

FIG. 11 illustrates an example data center that implements an overlay network on a network substrate using IP tunneling technology, according to some embodiments. A provider data center 1100 may include a network substrate that includes networking nodes 1112 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1110 using tunnels. The IP tunneling technology may provide a mapping and encapsulating system for creating an overlay network on a network (e.g., a local network in data center 1100 of FIG. 11) and may provide a separate namespace for the overlay layer (the public IP addresses) and the network substrate 1110 layer (the local IP addresses). Packets in the overlay layer may be checked against a mapping directory (e.g., provided by mapping service 1130) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1130) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 11, an example overlay network tunnel 1134A from a virtual machine (VM) 1124A (of VMs 1124A1-1124A4, via VMM 1122A) on host 1120A to a device on the intermediate network 1150 and an example overlay network tunnel 1134B between a VM 1124A (of VMs 1124A1-1124A4, via VMM 1122A) on host 1120A and a VM 1124B (of VMs 1124B1-1124B4, via VMM 1122B) on host 1120B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 11, at least some networks in which embodiments may be implemented may include hardware virtualization technology that enables multiple operating systems to run concurrently on a host computer (e.g., hosts 1120A and 1120B of FIG. 11), i.e. as virtual machines (VMs) 1124 on the hosts 1120. The VMs 1124 may, for example, be executed in slots on the hosts 1120 that are rented or leased to customers of a network provider. A hypervisor, or virtual machine monitor (VMM) 1122, on a host 1120 presents the VMs 1124 on the host with a virtual platform and monitors the execution of the VMs 1124. Each VM 1124 may be provided with one or more local IP addresses; the VMM 1122 on a host 1120 may be aware of the local IP addresses of the VMs 1124 on the host. A mapping service 1130 may be aware of (e.g., via stored mapping information 1132) network IP prefixes and IP addresses of routers or other devices serving IP addresses on the local network. This includes the IP addresses of the VMMs 1122 serving multiple VMs 1124. The mapping service 1130 may be centralized, for example on a server system, or alternatively may be distributed among two or more server systems or other devices on the network. A network may, for example, use the mapping service technology and IP tunneling technology to, for example, route data packets between VMs 1124 on different hosts 1120 within the data center 1100 network; note that an interior gateway protocol (IGP) may be used to exchange routing information within such a local network.

In addition, a network such as the provider data center 1100 network (which is sometimes referred to as an autonomous system (AS)) may use the mapping service technology, IP tunneling technology, and routing service technology to route packets from the VMs 1124 to Internet destinations, and from Internet sources to the VMs 1124. Note that an external gateway protocol (EGP) or border gateway protocol (BGP) is typically used for Internet routing between sources and destinations on the Internet. FIG. 11 shows an example provider data center 1100 implementing a network that provides resource virtualization technology and that provides full Internet access via edge router(s) 1114 that connect to Internet transit providers, according to some embodiments. The provider data center 1100 may, for example, provide customers the ability to implement virtual computing systems (VMs 1124) via a hardware virtualization service and the ability to implement virtualized data stores 1116 on storage resources 1118A-1118N via a storage virtualization service.

The data center 1100 network may implement IP tunneling technology, mapping service technology, and a routing service technology to route traffic to and from virtualized resources, for example to route packets from the VMs 1124 on hosts 1120 in data center 1100 to Internet destinations, and from Internet sources to the VMs 1124. Internet sources and destinations may, for example, include computing systems 1170 connected to the intermediate network 1140 and computing systems 1152 connected to local networks 1150 that connect to the intermediate network 1140 (e.g., via edge router(s) 1114 that connect the network 1150 to Internet transit providers). The provider data center 1100 network may also route packets between resources in data center 1100, for example from a VM 1124 on a host 1120 in data center 1100 to other VMs 1124 on the same host or on other hosts 1120 in data center 1100.

A service provider that provides data center 1100 may also provide additional data center(s) 1160 that include hardware virtualization technology similar to data center 1100 and that may also be connected to intermediate network 1140. Packets may be forwarded from data center 1100 to other data centers 1160, for example from a VM 1124 on a host 1120 in data center 1100 to another VM on another host in another, similar data center 1160, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1118A-1118N, as virtualized resources to customers of a network provider in a similar manner.

Figure 12:
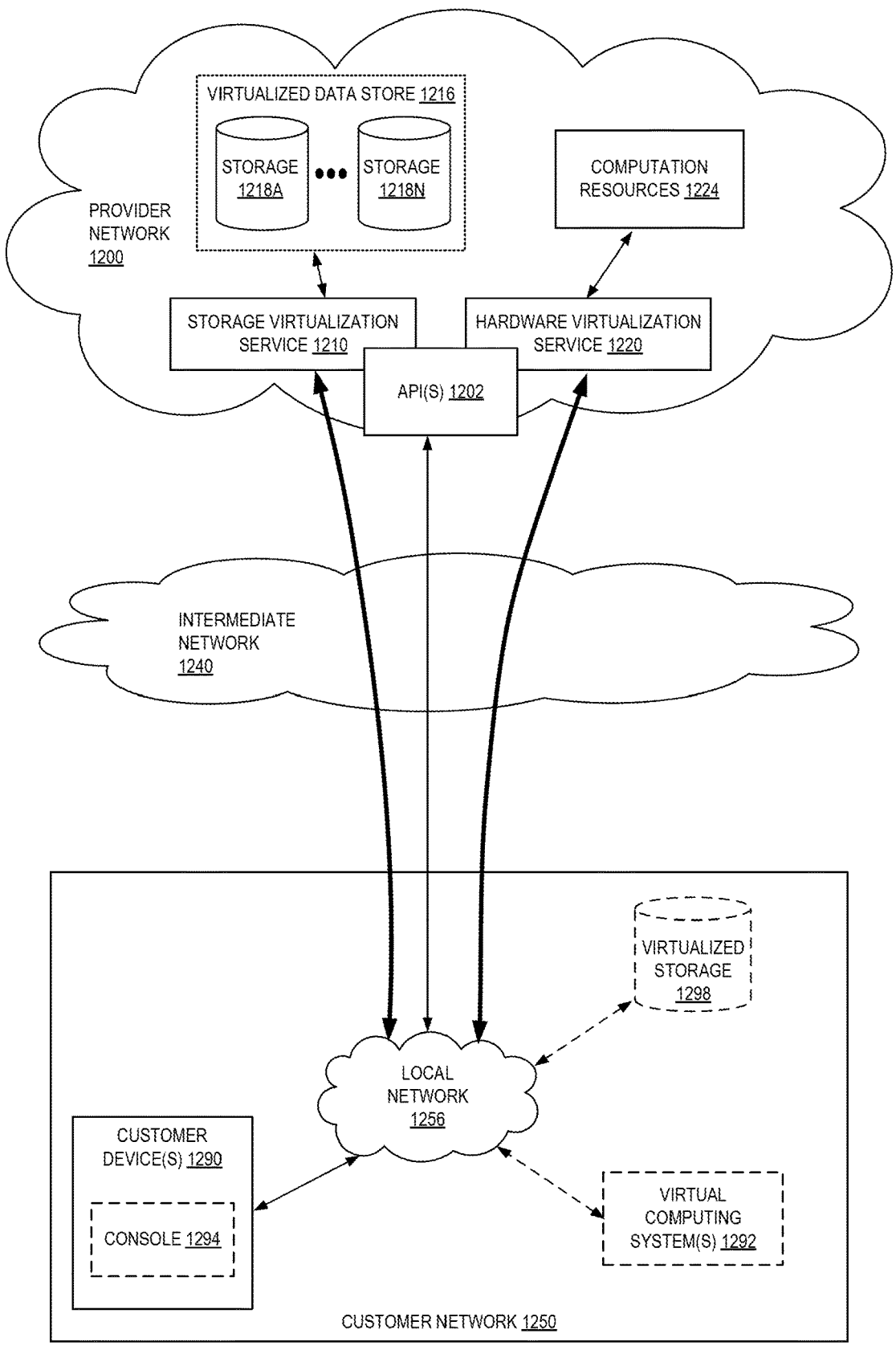
FIG. 12 is a block diagram of an example provider network that provides a storage virtualization service and a hardware virtualization service to customers according to some embodiments.

FIG. 12 is a block diagram of an example provider network that provides a storage virtualization service and a hardware virtualization service to customers, according to some embodiments. Hardware virtualization service 1220 provides multiple computation resources 1224 (e.g., VMs) to customers. The computation resources 1224 may, for example, be rented or leased to customers of the provider network 1200 (e.g., to a customer that implements customer network 1250). Each computation resource 1224 may be provided with one or more local IP addresses. Provider network 1200 may be configured to route packets from the local IP addresses of the computation resources 1224 to public Internet destinations, and from public Internet sources to the local IP addresses of computation resources 1224.

Provider network 1200 may provide a customer network 1250, for example coupled to intermediate network 1240 via local network 1256, the ability to implement virtual computing systems 1292 via hardware virtualization service 1220 coupled to intermediate network 1240 and to provider network 1200. In some embodiments, hardware virtualization service 1220 may provide one or more APIs 1202, for example a web services interface, via which a customer network 1250 may access functionality provided by the hardware virtualization service 1220, for example via a console 1294 (e.g., a web-based application, standalone application, mobile application, etc.). In some embodiments, at the provider network 1200, each virtual computing system 1292 at customer network 1250 may correspond to a computation resource 1224 that is leased, rented, or otherwise provided to customer network 1250.

From an instance of a virtual computing system 1292 and/or another customer device 1290 (e.g., via console 1294), the customer may access the functionality of storage virtualization service 1210, for example via one or more APIs 1202, to access data from and store data to storage resources 1218A-1218N of a virtual data store 1216 provided by the provider network 1200. In some embodiments, a virtualized data store gateway (not shown) may be provided at the customer network 1250 that may locally cache at least some data, for example frequently accessed or critical data, and that may communicate with virtualized data store service 1210 via one or more communications channels to upload new or modified data from a local cache so that the primary store of data (virtualized data store 1216) is maintained. In some embodiments, a user, via a virtual computing system 1292 and/or on another customer device 1290, may mount and access virtual data store 1216 volumes, which appear to the user as local virtualized storage 1298.

While not shown in FIG. 12, the virtualization service(s) may also be accessed from resource instances within the provider network 1200 via API(s) 1202. For example, a customer, appliance service provider, or other entity may access a virtualization service from within a respective virtual network on the provider network 1200 via an API 1202 to request allocation of one or more resource instances within the virtual network or within another virtual network.

Figure 13:
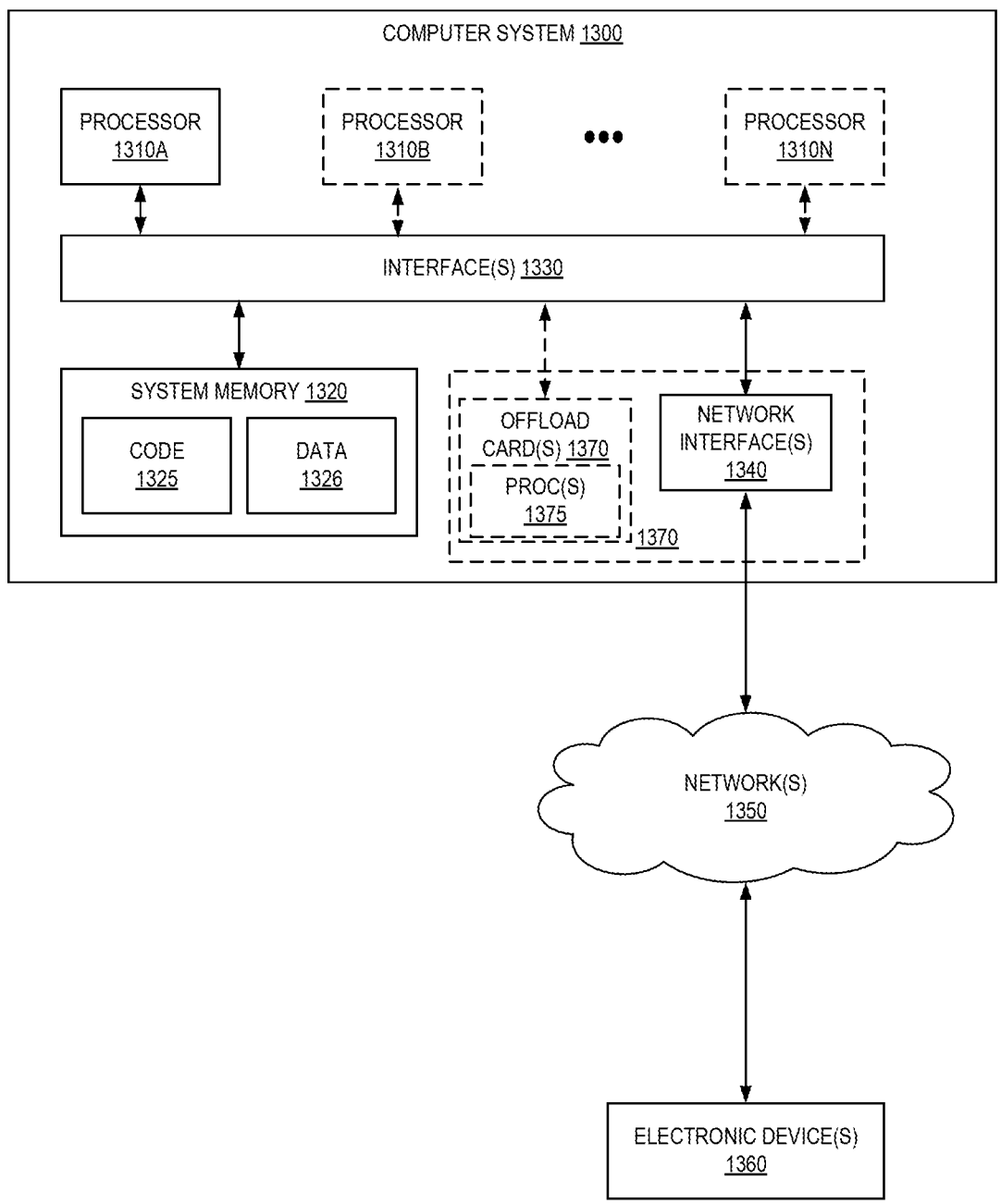
FIG. 13 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1300 illustrated in FIG. 13. In the illustrated embodiment, computer system 1300 includes one or more processors 1310 coupled to a system memory 1320 via an input/output (I/O) interface 1330. Computer system 1300 further includes a network interface 1340 coupled to I/O interface 1330. While FIG. 13 shows computer system 1300 as a single computing device, in various embodiments a computer system 1300 may include one computing device or any number of computing devices configured to work together as a single computer system 1300.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1310 may commonly, but not necessarily, implement the same ISA.

System memory 1320 may store instructions and data accessible by processor(s) 1310. In various embodiments, system memory 1320 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1320 as code 1325 and data 1326.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices 1360 attached to a network or networks 1350, such as other computer systems or devices as illustrated in FIG. 1, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1300 includes one or more offload cards 1370 (including one or more processors 1375, and possibly including the one or more network interfaces 1340) that are connected using an I/O interface 1330 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1300 may act as a host electronic device (e.g., operating as part of a hardware virtualization service) that hosts compute instances, and the one or more offload cards 1370 execute a virtualization manager that can manage compute instances that execute on the host electronic device. As an example, in some embodiments the offload card(s) 1370 can perform compute instance management operations such as pausing and/or un-pausing compute instances, launching and/or terminating compute instances, performing memory transfer/copying operations, etc. These management operations may, in some embodiments, be performed by the offload card(s) 1370 in coordination with a hypervisor (e.g., upon a request from a hypervisor) that is executed by the other processors 1310A-1310N of the computer system 1300. However, in some embodiments the virtualization manager implemented by the offload card(s) 1370 can accommodate requests from other entities (e.g., from compute instances themselves), and may not coordinate with (or service) any separate hypervisor.

In some embodiments, system memory 1320 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1300 via I/O interface 1330. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Figure 14:
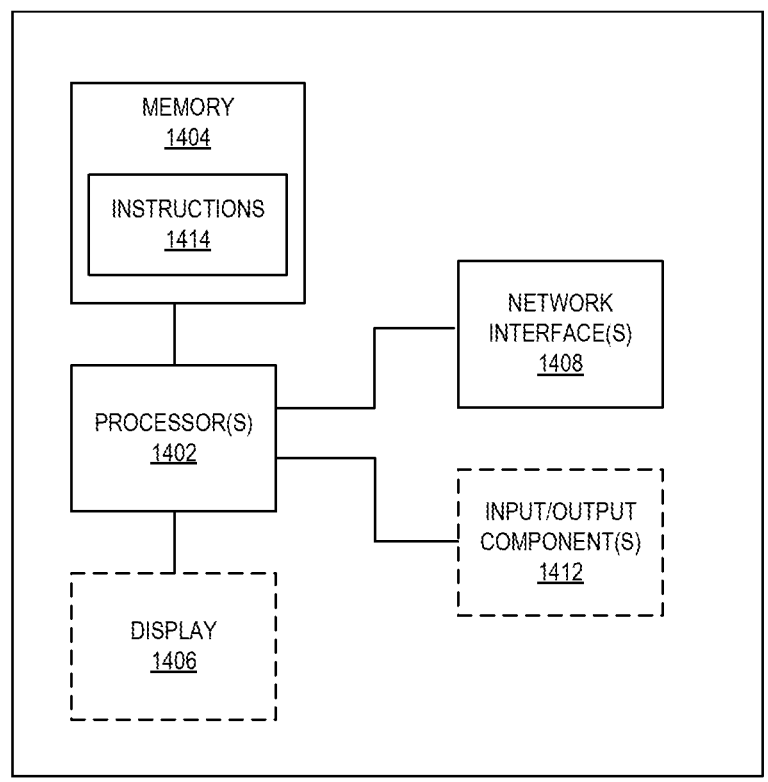
FIG. 14 illustrates a logical arrangement of a set of general components of an exemplary computing device that can be utilized in accordance with various embodiments.

FIG. 14 illustrates a logical arrangement of a set of general components of an example computing device 1400 such as the web services provider, etc. Generally, a computing device 1400 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1402 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1404) to store code (e.g., instructions 1414) and/or data, and a set of one or more wired or wireless network interfaces 1408 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1404) of a given electronic device typically stores code (e.g., instructions 1414) for execution on the set of one or more processors 1402 of that electronic device. One or more parts of various embodiments may be implemented using different combinations of software, firmware, and/or hardware.

A computing device 1400 can include some type of display element 1406, such as a touch screen or liquid crystal display (LCD), although many devices such as portable media players might convey information via other means, such as through audio speakers, and other types of devices such as server end stations may not have a display element 1406 at all. As discussed, some computing devices used in some embodiments include at least one input and/or output component(s) 1412 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 15:
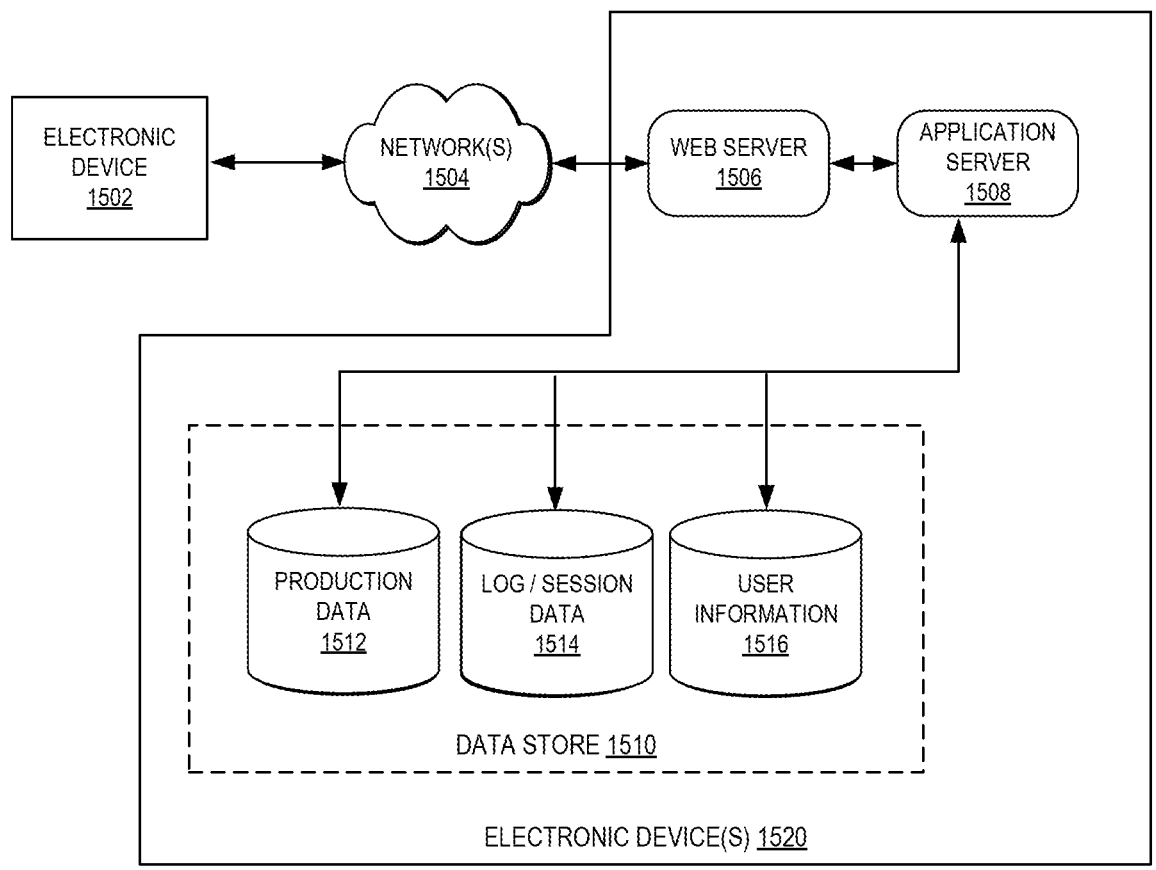
FIG. 15 illustrates an example of an environment for implementing aspects in accordance with various embodiments.

As discussed, different approaches can be implemented in various environments in accordance with the described embodiments. For example, FIG. 15 illustrates an example of an environment 1500 for implementing aspects in accordance with various embodiments. For example, in some embodiments requests are HyperText Transfer Protocol (HTTP) requests that are received by a web server (e.g., web server 1506), and the users, via electronic devices, may interact with the provider network via a web portal provided via the web server 1506 and application server 1508. As will be appreciated, although a web-based environment is used for purposes of explanation, different environments may be used, as appropriate, to implement various embodiments. The system includes an electronic client device 1502, which may also be referred to as a client device and can be any appropriate device operable to send and receive requests, messages or information over an appropriate network 1504 and convey information back to a user of the device 1502. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1504 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1504 includes the Internet, as the environment includes a web server 1506 for receiving requests and serving content in response thereto, although for other networks an alternative device serving a similar purpose could be used, as would be apparent to one of ordinary skill in the art.

The illustrative environment includes at least one application server 1508 and a data store 1510. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1508 can include any appropriate hardware and software for integrating with the data store 1510 as needed to execute aspects of one or more applications for the client device 1502 and handling a majority of the data access and business logic for an application. The application server 1508 provides access control services in cooperation with the data store 1510 and is able to generate content such as text, graphics, audio, video, etc., to be transferred to the client device 1502, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1502 and the application server 1508, can be handled by the web server 1506. It should be understood that the web server 1506 and application server 1508 are not required and are merely example components, as structured code discussed herein can be executed on any appropriate device or host machine as discussed elsewhere herein.

The data store 1510 can include several separate data tables, databases, or other data storage mechanisms and media for storing data relating to a particular aspect. For example, the data store illustrated includes mechanisms for storing production data 1512 and user information 1516, which can be used to serve content for the production side. The data store 1510 also is shown to include a mechanism for storing log or session data 1514. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update, or otherwise process data in response thereto. In one example, a user might submit a search request for a certain type of item. In this case, the data store 1510 might access the user information 1516 to verify the identity of the user and can access a production data 1512 to obtain information about items of that type. The information can then be returned to the user, such as in a listing of results on a web page that the user is able to view via a browser on the user device 1502. Information for a particular item of interest can be viewed in a dedicated page or window of the browser.

The web server 1506, application server 1508, and/or data store 1510 may be implemented by one or more electronic devices 1520, which can also be referred to as electronic server devices or server end stations, and may or may not be located in different geographic locations. Each of the one or more electronic devices 1520 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the environment 1500 in FIG. 15 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    requesting third party data from a repository hosted by a web services provider;
    receiving domain mapped third party data from the web services provider, the web services provider to utilize a domain mapper to generate the domain mapped third party data;
    allocating resources of the web services provider to train a machine learning model using the received domain mapped third party data;
    training the model using the received domain mapped third party data using on the allocated resources of the web services provider;
    generating at least one container including the model and the domain mapper used to generate the domain mapped third party data;
    allocating resources of the web services provider to perform inference using the container;
    performing inference using the allocated resources of the web services provider by:
        receiving scoring data,
        domain mapping the received scoring data using the domain mapper,
        applying the machine learning model to the domain mapped received scoring data to generate an output result, and
        providing the output result.

2. The computer-implemented method of claim 1, wherein the domain mapper was generated by a generative adversarial network.

3. The computer-implemented method of claim 1, wherein allocated resources include one or more virtual machines executing on hardware that are to execute the container.

4. A computer-implemented method comprising:
    training a machine learning model using domain mapped third party data; and performing inference using the machine learning model by:
  receiving scoring data,
    domain mapping the received scoring data using a domain mapper that was used to generate the domain mapped third party data, and
    applying the machine learning model to the domain mapped received scoring data to generate an output result.

5. The computer-implemented method of claim 4, further comprising:
  generating at least one container including the model and the domain mapper used to generate the domain mapped third party data.

6. The computer-implemented method of claim 5, wherein the inference is performed by executing the at least one container.

7. The computer-implemented method of claim 4, wherein the domain mapper was generated by a generative adversarial network.

8. The computer-implemented method of claim 4, further comprising:
  adding the model and the domain mapper used to generate the domain mapped third party data to repository.

9. The computer-implemented method of claim 4, further comprising:
  requesting and receiving the domain mapped third party data from a repository, the repository including a plurality of third party data and a plurality of machine learning data.

10. The computer-implemented method of claim 4, requesting and receiving the model to train from a repository, the repository including a plurality of third party data and a plurality of machine learning data.

11. The computer-implemented method of claim 4, wherein the domain mapper is a one-way function implemented as a part of a machine learning model.

12. The computer-implemented method of claim 4, wherein the domain mapper is one of a plurality of domain mappers.

13. The computer-implemented method of claim 4, wherein the domain mapper is provided by the third party.

14. The computer-implemented method of claim 4, further comprising:
  training the domain mapper using training data of the third party.

15. A system comprising:
an endpoint implemented by a first one or more electronic devices; and
a web services model repository service implemented by a second one or more electronic devices, the web services model repository service including instructions that upon execution are to cause:
  a training a machine learning model using domain mapped third party data, and
  a performance of inference using the machine learning model of the endpoint by:
    receiving scoring data,
    domain mapping the received scoring data using a domain mapper that was used to generate the domain mapped third party data, and
    applying the machine learning model to the domain mapped received scoring data to generate an output result.

16. The system of claim 15, wherein the web services model repository service to further generate at least one container including the model and the domain mapper used to generate the domain mapped third party data.

17. The system of claim 16, wherein the inference is performed by executing the at least one container.

18. The system of claim 15, wherein the domain mapper is to be generated by a generative adversarial network.

19. The system of claim 15, wherein the web services model repository service is further to add the model and the domain mapper used to generate the domain mapped third party data to repository.

20. The system of claim 15, wherein the web services model repository service is further to train the domain mapper using training data of the third party.

* * * * *